(No Model.)  A. O. FRICK.  4 Sheets—Sheet 2.
TRACTION ENGINE.
No. 258,401.  Patented May 23, 1882.
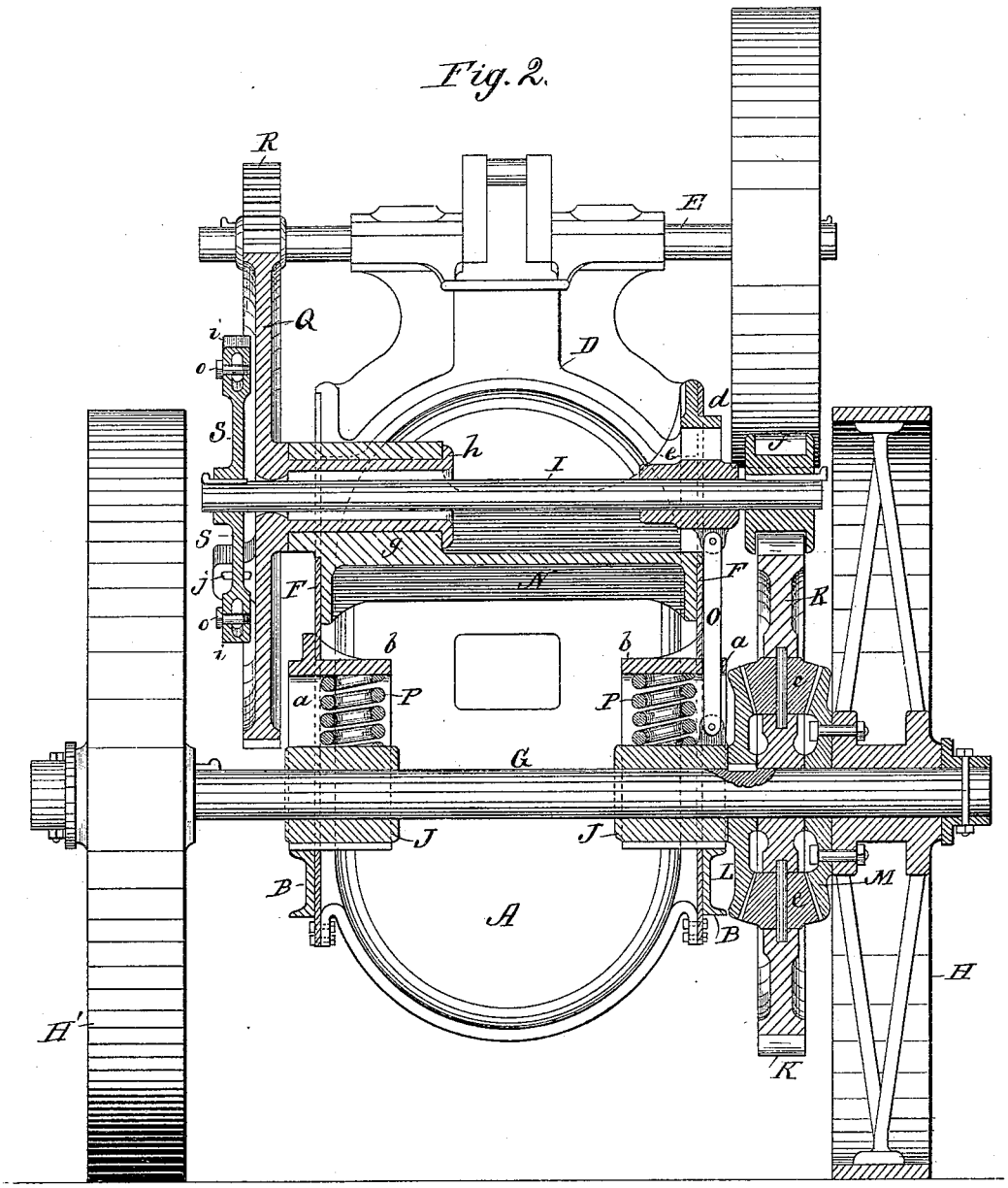
WITNESSES:
W. W. Hollingsworth
Edw. W. Byen
INVENTOR:
A. O. Frick
BY
ATTORNEYS.

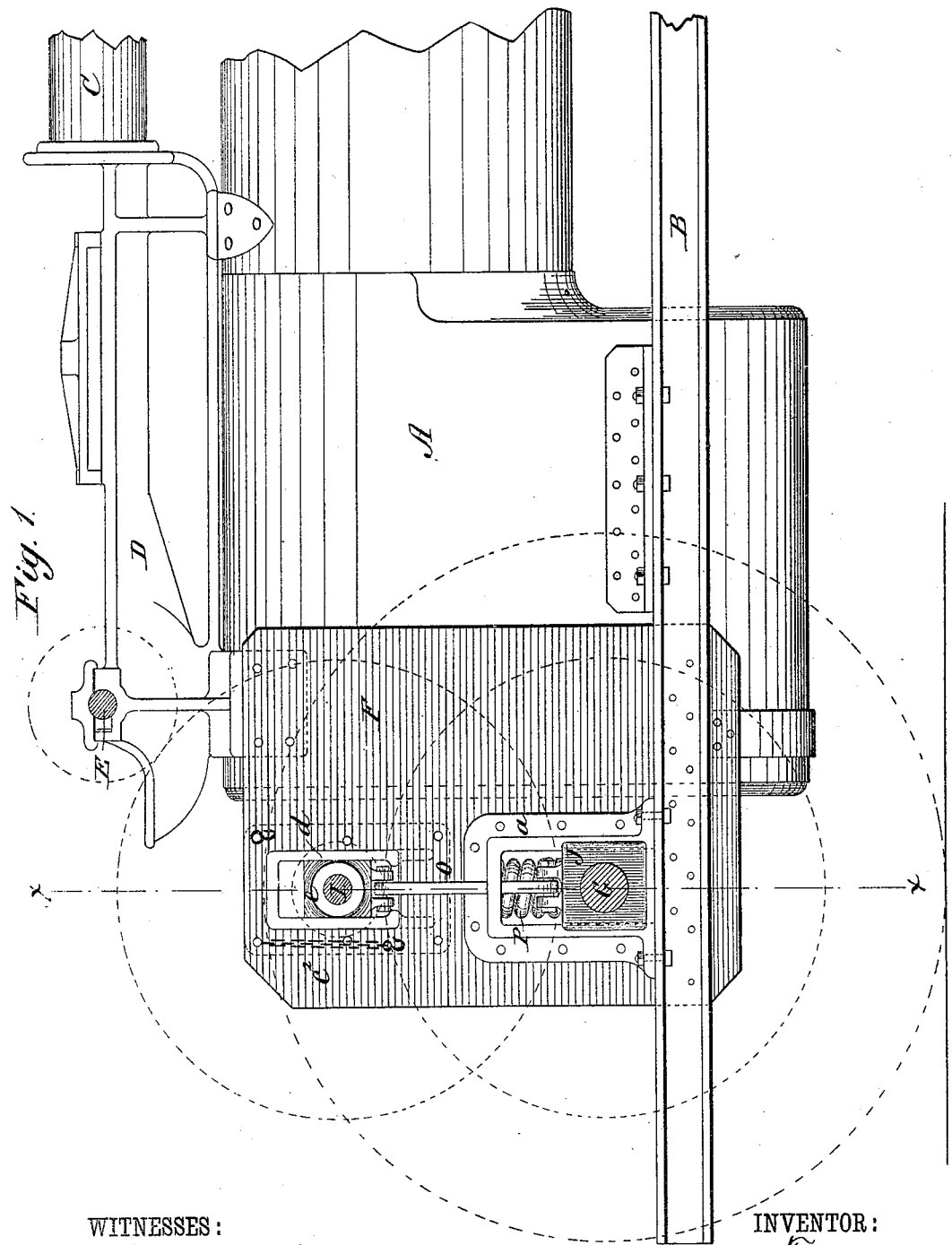

(No Model.)  A. O. FRICK.  4 Sheets—Sheet 3.
TRACTION ENGINE.
No. 258,401. Patented May 23, 1882.
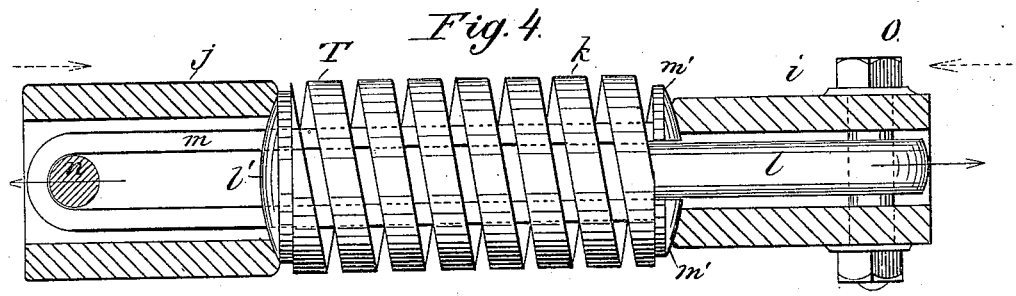
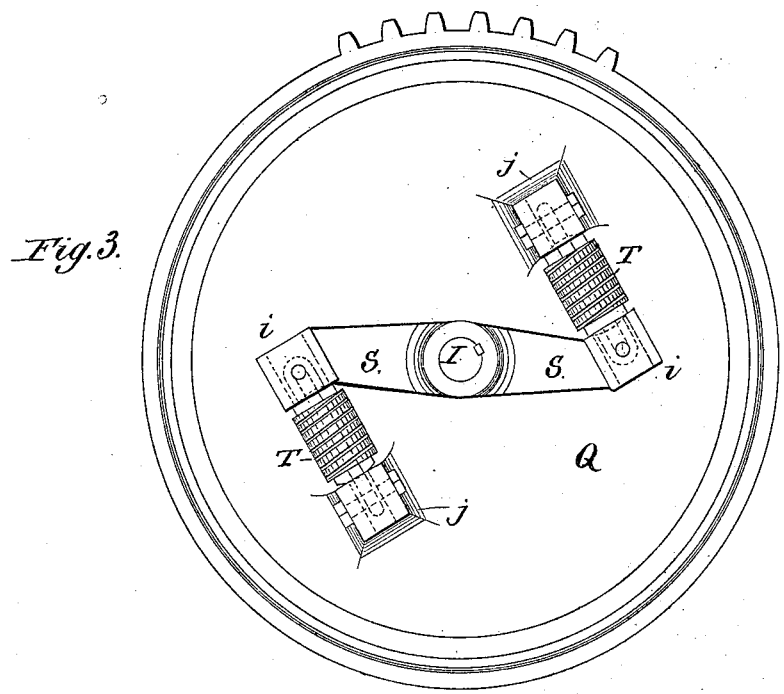
WITNESSES:
W. W. Hollingsworth
Edw. W. Byrn
INVENTOR:
A. O. Frick
BY
ATTORNEYS.

(No Model.) 4 Sheets—Sheet 4.
A. O. FRICK.
TRACTION ENGINE.
No. 258,401. Patented May 23, 1882.
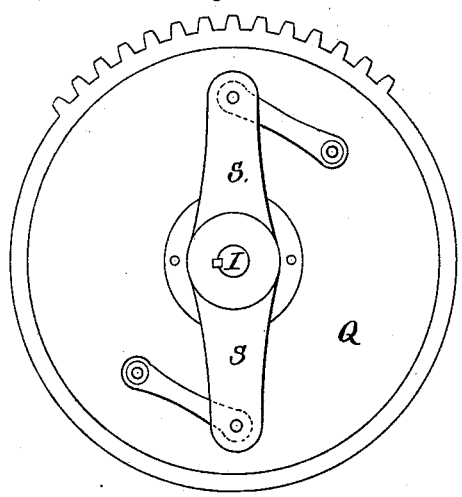
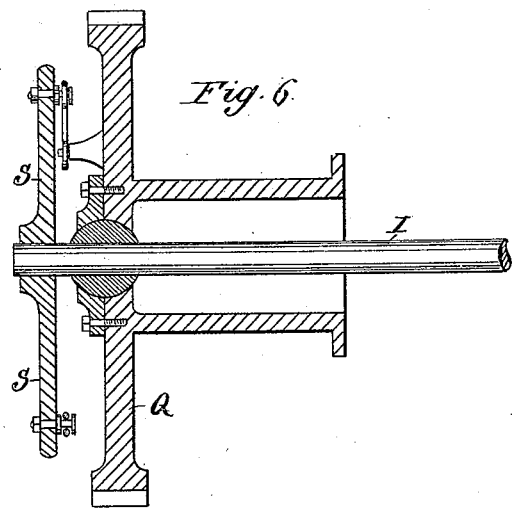
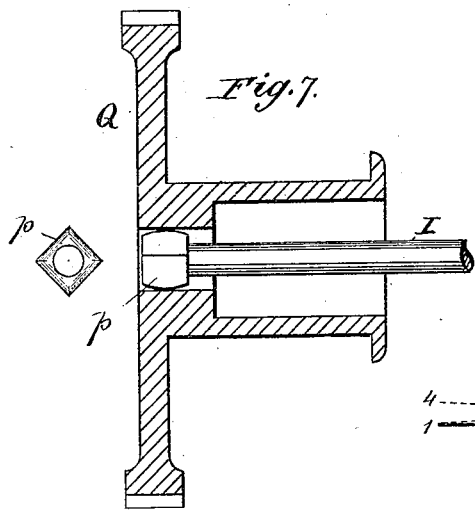
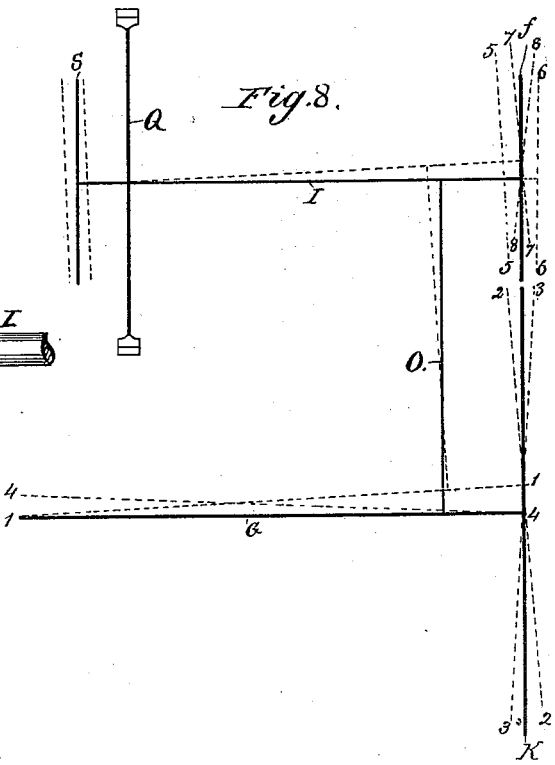
WITNESSES:
W. W. Hollingsworth
Edw. W. Byrn.
INVENTOR:
A. O. Frick
BY
ATTORNEYS.

UNITED STATES PATENT OFFICE.

ABRAHAM O. FRICK, OF WAYNESBOROUGH, PENNSYLVANIA.

TRACTION-ENGINE.

SPECIFICATION forming part of Letters Patent No. 258,401, dated May 23, 1882.

Application filed March 7, 1882. (No model.)

*To all whom it may concern:*

Be it known that I, ABRAHAM O. FRICK, of Waynesborough, in the county of Franklin and State of Pennsylvania, have invented a new and Improved Traction-Engine; and I do hereby declare that the following is a full, clear, and exact description of the same, reference being had to the accompanying drawings, forming part of this specification, in which—

Figure 1 is a side elevation of the rear portion of my traction-engine, the positions of the traction wheels and gears being shown in dotted lines. Fig. 2 is a vertical transverse section through the line $x$ $x$ of Fig. 1, the traction wheels and gears being in proper position. Fig. 3 is a side view in detail, showing the means for connecting the counter-shaft to its driving-gear. Fig. 4 is an enlarged detail, partly in section, of the tug-spring and its connections, as shown in Fig. 3. Fig. 5 is a side view, and Fig. 6 a section, of a modified means for connecting the counter-shaft to its driving-gear. Fig. 7 is a sectional view, showing a further modification of the same. Fig. 8 is a diagram view, showing the variation in the position of the gear-wheels under different conditions of movement of the axle.

My invention relates to an improved construction of traction-engine, designed to overcome the difficulties which attend the use of this class of inventions upon uneven earth roads. In this class of engines, which are driven by toothed wheels, it is of course necessary to have all the gears between the engine and traction or running wheels in firm contact. On the other hand, the interposition of springs between the axle and the load is also desirable to accommodate the engine to obstructions—such as stones, &c.—in the road, and relieve the gear-teeth of the shocks which such obstructions would involve; but as the interposition of springs to relieve vertical jolts would involve from vibration at times a change in the distance between the axis of the traction-wheels and the axis of the gear-wheels, the other objection of disconnecting the gears is met with.

The object of my invention is to provide such a construction as will reconcile the use of these apparently antagonistic features, so as to secure the following results: first, perfect freedom to vibrate vertically without separating the gears and without involving destructive strains on the teeth as produced by said vertical jolts; secondly, an elastic rotary strain from the engine, so that if the wheels meet an obstruction and stop the rotary strain of the gears of the engine is not allowed to strip or strain the teeth; thirdly, to provide means for accommodating the gears to the movement incident to lateral swaying or the elevation of one side of the engine, thereby avoiding the straining or jamming the gears; and, fourthly, to provide a simple and effective means for imparting an elastic rotary strain from the engine to the traction-wheels for going either forward or backward, all as will be hereinafter more fully described.

In the drawings, Fig. 1, A represents the boiler; B, the supporting-sills; C, the engine-cylinder; D, the engine-bed carrying the crank-shaft E, and F side plates that are attached to and support the rear saddle portion of the engine-bed. (See Fig. 2.) In the patent granted me July 5, 1881, No. 243,881, I described and claimed the cylinder C, bed D, crank-shaft E, and side plates, F, all rigidly connected to each other and to the axle independently of the boiler, so that the boiler was relieved of strains—first, the strain or thrust between the crank-shaft and the cylinder by the bed D tying these two parts together, and, secondly, of the strain between the crank-shaft and the axle, which strain is taken up by the side plates, F, which latter also carry the weight of the superposed part. These features I have preserved in my present invention, having adapted them to further improvements, which I will now proceed to describe.

G is the axle upon which are disposed the running or traction wheels H H', one of which, H, is loose on the axle, and the other of which is rigid or tight upon said axle. I is the counter-shaft, arranged above the axle and in parallel position between it and the crank-shaft E. Now, instead of fixing the axle G rigidly to the side plates, as in my patent referred to, I slot both of the side plates, F F, vertically near the axle, (see Fig. 1,) and to the edges of said slots I bolt the marginal guide-frames $a$ $a$. These marginal guide-frames are provided with lugs or housings $b$, Fig. 2, and about the axle and moving vertically in the guide-frames *a* are arranged boxes J J. Between these boxes and the lugs or housings *b* of the marginal frames *a* are placed spiral or other form of springs P P, which press indirectly upon the axle at their bottom ends, and at their top ends carry through the lugs *b*, side plates, F F, and sills B B, the entire weight of the engine, and render the traction-wheels and their axle vertically movable as regards the rest of the engine, with an elastic support between them and the engine.

K L M, Fig. 2, is a compensating-gear, which is designed to permit independent movement in the two traction-wheels, so as to allow one of the traction-wheels to remain at rest, or approximately so, while the other one is turning a curve. This is not a new feature in itself; but as it has a relation to the other parts of my invention it is necessary to describe it. It consists of a gear-wheel, K, loose on the axle and provided with two or more bevel-pinions, *c*, set upon axes lying within the plane of the wheel, and two larger bevel-gears, L and M, one of which, L, is keyed tightly on the axle G and rotates traction-wheel H′, and the other of which, M, is loose on the axle and is rigidly bolted to the adjacent traction-wheel, H, which also revolves loosely on the axle and is turned by said bevel-gear M. Now, for going straight ahead the rotation of wheel K through its pinions *c c* locks L and M together, and rotating them equally also rotates equally the axle G and wheel H′ on the one hand, and the wheel H on the other. If, however, H′ is stationary and H turning, the rotation of K then causes its pinions *c* to traverse wheel L, and imparts an accelerated rotation to M and H. On the other hand, if H is stationary and H′ turning, the pinion *c* traverses M and imparts an accelerated rotation to L, and through axle G to wheel H′. This compensating-gear dispenses with the necessity of two trains of gear leading from the engine to the two traction-wheels.

I will now proceed to describe the means for preserving the continuous engagement of the driving-gears under the varying conditions of travel over uneven roads.

The side plates, F F, are connected by a transverse brace, N, just beneath the counter-shaft, which brace at the end next to the compensating-gear is extended through the side plate in the form of a vertical guide-frame, *d*, and the counter-shaft at this point, instead of being held in fixed bearings, is carried by a box, *e*, that slides vertically in said guide-frame, giving to said counter-shaft at this end a radial or sidewise movement in vertical direction. This counter-shaft is provided outside of the box with a rigidly-keyed pinion, *f*, which is always in gear with the toothed wheel K of the compensating-gear when the engine is in working condition. To hold this pinion always in gear with wheel K its axis is kept always the same distance from the axis of the wheel K by means of one or more links or bars, O, which is loosely jointed at the top to the box of the counter-shaft and at the bottom to the box of the main axle, so that when the axle rises against the tension of the spring P at this end, the link O forces up counter-shaft I, and the pinion *f* with it, preserving by the vertical sidewise movement of counter-shaft I a practically uniform distance between the center of pinion *f* and the center of wheel K. As the axle and counter-shaft at the other end are not connected by gears and are not required to be rigidly fastened together, the axle is free to move up and down at this end, as circumstances may require.

At the end of the brace N opposite the gears *f* K there is formed a fixed bearing, *g*, in which revolves the hollow hub *h* of a gear-wheel, Q, that engages with and derives motion from pinion R on the crank-shaft E. Now, to transmit an elastic rotary strain from the engine to the traction-wheels, I connect the gear-wheel Q to the counter-shaft I in the following manner: On the gear-wheel Q, (see Figs. 3 and 4,) I form lugs *j*, and the counter-shaft I is extended through a loose rocking bearing in the center of wheel Q, and upon the outside is provided with double-crank arms S S, or in the place of the same a wheel, which arms upon each side of the center have a corresponding connection with the wheel Q. As both these connections are exactly alike, it will be sufficient to describe one of them. Thus on the end of each arm is formed a hollow lug, *i*, and upon the wheel a corresponding hollow lug, *j*. Between these two lugs is arranged a tug-spring, T, consisting of a coil-spring, *k*, (see Fig. 4,) and two longitudinal stirrups or loops, *l* and *m*. These loops are bent in the middle and pass in planes at right angles to each other around the bolts *n* and *o*, fixed respectively in the lugs *i* and *j*, and the ends of said loops then pass centrally through the spring *k*, and terminate, the loop *m* in the feet or abutments *m′ m′*, and the loop *l* in feet or abutments *l′ l′*, which feet or abutments *l′* bear against spring *k* at one end, while *m′* bear against the spring *k* at the other, so that whenever the wheel Q is strained in the direction of the full-lined arrows to drive the engine ahead, the parts *m′* and *l′* then act as feet to compress the spring *k*, and said strain is transmitted through arms S to counter-shaft I as an elastic rotary strain.

In constructing the lugs *i* and *j* it will be seen that they have their faces next to the feet *l′ m′* rounded or hollowed out, and the holes through these lugs pass all the way through, so that if it is desired to back the engine and the strain is reversed, as indicated by the dotted arrows, then the lugs *i* and *j* bear against the parts *l′* and *m′* as abutments, and the spring *k* is compressed to produce an elastic strain in the reverse direction. It is necessary, however, with this form of tug attachments, that the lugs *i* and *j* should be open at their outer ends, or else long enough to allow the bend of loops *l* and *m* to move outwardly from the bolts *n* and *o* in their backing movement. The object in making the faces of lugs *i* and *j* concave next to the abutments *m'* and *l'* is to permit the surfaces to turn slightly over each other, somewhat after the manner of a ball-and-socket joint. It will be seen from the foregoing description that a single spring, *k*, and a single set of connections are made to work equally with a rotary elastic strain for moving either forward or backward.

In defining this feature of my invention I would state that I am aware that springs have heretofore been interposed between parts of the gear of a traction-engine to impart a rotary elastic strain, and I do not claim this broadly.

I am also aware that the tug-spring T is not new in itself, and I therefore only claim it in combination with the draft-bolts *n* and *o* and the hollow abutting lugs *i* and *j*.

I have described the hole in wheel Q, through which counter-shaft I protrudes, as a loose rocking bearing. The object of this is to permit the other end of shaft I to vibrate radially and still be connected with wheel Q for rotary movement. This rocking connection may be made in a number of different ways. Thus in Fig. 2 the bearing in wheel Q may be simply enlarged or tapered at each side, or a ball-joint, *q*, may be used, as in Fig. 6. This radial movement of shaft I may also be preserved without the use of springs for a rotary elastic strain. Thus, as shown in Fig. 5, links may be used instead of springs; or, as shown in Fig. 7, the end of shaft I may have a rocking head, *p*, which is angular in cross-section and curved on its longitudinal surfaces, which head rocks in an angular hole in the wheel Q, so that while it rotates rigidly with the wheel Q it allows the shaft I to have radial play.

I will now proceed to describe the means for accommodating the gear to the sidewise pitching of the engine as induced by an inclination of the axle to the horizontal.

Referring to diagram Fig. 8, G represents the main axle; I, the counter-shaft; K, the gear-wheel on the axle; *f*, the pinion on the counter-shaft; Q, the gear-wheel on the counter-shaft; S, the double cranks, rigidly fixed to the counter-shaft and connected flexibly to wheel Q; and O, the connecting-link for shaft I and axle G. Now, as the axle G and shaft I are constant and invariable axes of wheels *f* and K, a change in the position of these shafts, even when connected by link O, involves the throwing of the wheel K and *f* into different planes, which difficulty is further exaggerated by the fact that G and I vibrate as radii of different length. Thus, if the right-hand side of the engine is elevated, the plane of wheel K goes into the line 2 2 and the plane of *f* goes into the line 7 7, which lines 2 2 and 7 7 are out of alignment. If the left-hand side of the engine is raised, the wheel K goes into the plane 3 3 and the pinion *f* has a reverse inclination to the line 7 7, as shown at 8 8. To remedy this matter I make the counter-shaft I longitudinally adjustable, so as to slide freely in the direction of its length, and the gears K and *f*, I connect together by such mesh or form of teeth as will make one to follow the other in its lateral movement. Thus in Fig. 2 the projecting teeth in K enter notches or indented teeth in *f*. The result of this is that when axle G occupies position 1 1, Fig. 8, its wheel, K, moving to 2 2, drags pinion *f* to 5 5, pushing shaft I endwise and preserving the coincidence of the plane of the two wheels K and *f*, and when axle G moves to 4 4, wheel K, moving to 3 3, drags pinion *f* to 6 6, pulling the shaft I endwise and preserving the coincidence of the planes of the two wheels. The connection between shaft I and the gear-wheel Q, it will be seen, is a loose connection, such as to permit the double adjustment of shaft I both radially and longitudinally.

Instead of making the counter-shaft to slide longitudinally to secure the result just described, either the pinion *f* or the gear-wheel K may have its teeth made wide enough to slide across each other without disconnection of the gears.

Instead of forming the side plates, F, with slots and then inserting marginal guide-frames *a* and *b*, I may cast or otherwise form these side connections with the proper guide-slots in them for the axle and shaft I.

An advantage belonging to the connection of the counter-shaft bearing I at one end to link O may be seen in the fact that whenever it is desirable to transport the engine by means of horses the pin connecting link O and the bearing of the counter shaft may be withdrawn and this end of the counter-shaft raised out of gear and held up by a pin or chain, $c^2$, Fig. 1, so that the draft of the engine by the team will not necessitate the turning of all the gears, which not only lightens said draft, but prevents wearing out the gears.

In relation to the movement of the counter-shaft sidewise, I would state that I am aware that said counter-shaft, the crank-shaft, and the axle have been made vertically adjustable together at right angles to their axes, and with an equal movement at each end, as in English Patent No. 120, 1859. This involves a variation in the throw of the piston-rod, and I do not claim such arrangement. I am also aware that motion has been transmitted to the axle of a traction-engine by a counter-shaft having a universal joint in it and located on the same level with the axle. The location of the counter-shaft above the axle and their connection by a link at one end only is therefore an important element of novelty in this part of my invention.

Having thus described my invention, what I claim as new is—

1. The engine-cylinder, crank-shaft, and slotted side plates, all connected together for transmitting the strain to the axle independently of the boiler, in combination with the axle, springs supporting the weight of the engine, a radially-movable counter-shaft having one end extended through and made vertically movable in a slot in the side plate, and a link connecting the counter-shaft at this end to the axle, substantially as and for the purpose described.

2. The combination of the axle, the counter-shaft, and the driving-gear, the axle being connected at one end to the counter-shaft by a link, and the counter-shaft having at its other end a loose jointed or flexible connection with its driving-gear, substantially as shown and described.

3. The gear-wheel Q, mounted in fixed bearings and having a hollow hub, in combination with the counter-shaft arranged concentrically therein, and connected to said gear-wheel for a loose or flexible movement, substantially as described.

4. The deflectible counter shaft I, with its gear-wheels, arranged above the main axle, and combined with the crank-shaft and its driving-gear, the axle and its driving-gear, the supporting-springs for the engine, and a link for connecting the axle and counter-shaft at one end only, as and for the purpose described.

5. The combination, with the axle of a traction-engine having a gear-wheel thereon, of the longitudinally-adjustable counter-shaft I, having a gear-wheel, substantially as described, arranged to mesh with the wheel on the axle, and to follow the same in its lateral variations.

6. The combination, with the axle having compensating-gear K L M c, arranged, as described, to transmit rotary strain to either or both of the traction-wheels, of springs for sustaining the weight of the engine, a horizontal counter-shaft having one end only made vertically movable for a radial adjustment, and a link connecting the bearing of the axle at one end to the bearing of the counter-shaft, from which motion is imparted to the compensating-gear, as described.

7. The deflectible and longitudinally-movable counter-shaft I, arranged above and combined with the axle and supporting-springs by wheels and a link at one end only, and connected to the driving mechanism, substantially as described.

8. The side plates, F, slotted at one side and combined with its brace N, having marginal guide d at that side and a bearing at the other, and the counter-shaft having a movable box, e, playing in said guide, as set forth.

9. The tug-spring T, composed of a single spring, k, and loops or stirrups l m, with feet l' m', in combination with the draft-bolts n and o, and the hollow abutment-lugs i and j, whereby the same spring is made to furnish a rotary elastic strain in either forward or backward movement, as described.

The above specification of my invention signed by me in the presence of two subscribing witnesses.

ABRAHAM O. FRICK.

Witnesses:
EDWD. W. BYRN,
CHAS. A. PETTIT.